United States Patent [19]
Wittwer

[11] Patent Number: 5,231,292
[45] Date of Patent: Jul. 27, 1993

[54] DEVICE FOR PHOTOGRAMMETRICALLY SURVEYING AN OBJECT IN WHICH A REFERENCE PATTERN IS ARRANGED OUTSIDE SENSOR IMAGING BEAM PATHS

[75] Inventor: Willy Wittwer, Wolfsburg, Fed. Rep. of Germany

[73] Assignee: Leica Aarau AG, Aarau, Switzerland

[21] Appl. No.: 768,595

[22] PCT Filed: Dec. 3, 1990

[86] PCT No.: PCT/EP90/02073

§ 371 Date: Oct. 1, 1991

§ 102(e) Date: Oct. 1, 1991

[87] PCT Pub. No.: WO91/09273

PCT Pub. Date: Jun. 27, 1991

[30] Foreign Application Priority Data

Dec. 1, 1989 [DE] Fed. Rep. of Germany ....... 3939691

[51] Int. Cl.⁵ .................... G01N 21/86; G01C 11/02
[52] U.S. Cl. ............................. 250/561; 356/152
[58] Field of Search ............. 250/561, 560, 562, 571, 250/572, 216, 558, 237 G; 356/1, 4, 376, 400, 401, 141, 152; 358/106, 107

[56] References Cited

U.S. PATENT DOCUMENTS

| | | | |
|---|---|---|---|
| 3,614,237 | 10/1971 | Kyle et al. | 356/376 |
| 4,349,177 | 9/1982 | Mundy et al. | 250/237 G |
| 4,634,279 | 1/1987 | Ross et al. | 250/558 |
| 4,636,648 | 1/1987 | Egami et al. | 250/571 |
| 4,648,717 | 3/1987 | Ross et al. | 250/558 |
| 4,682,041 | 7/1987 | Egami et al. | 250/571 |
| 4,825,394 | 4/1989 | Beamish et al. | 356/376 |
| 4,897,539 | 1/1990 | Wester-Ebinghaus | 250/216 |
| 5,028,799 | 7/1991 | Chen et al. | 250/561 |

FOREIGN PATENT DOCUMENTS 2631226 1/1978 Fed. Rep. of Germany.
3712958 10/1988 Fed. Rep. of Germany.

OTHER PUBLICATIONS

Bopp et al., "Ein Orientierungs-und Kalibrierungsverfahren für nichttopographische Anwendungen der Photogrammetrie", AVN May 1987, pp. 183–188.

Jacobi et al., "Kalibrieren gewöhnlicher Photoapparate und deren Verwendung als Messkammern", Bul Feb. 1968, pp. 59–70.

H. Brun, et al "Fotogrammetrische Vermessung von Kraftfahrzeugen" [Photogrammetric Surveying of Motor Vehicles] ATZ, Jun. 1989, No. 6, pp. 341–347.

Primary Examiner—David C. Nelms
Assistant Examiner—John R. Lee
Attorney, Agent, or Firm—Foley & Lardner

[57] ABSTRACT

In a device for photoqrammetrically surveying an object using a number of sensors which can be positioned individually with respect to the object, position of the sensors (5, 6, 7) an optical reference pattern records the respective positions of the sensors. The optical reference pattern is arranged outside the imaging-beam paths of the same in defined spatial position in absolute terms and is imaged via optical deviating means by means of sensors. Arranging the reference pattern (14) outside the imaging-beam paths gives greater freedom regarding the capability of positioning the sensors with respect to arranging the reference pattern on the object.

3 Claims, 1 Drawing Sheet

DEVICE FOR PHOTOGRAMMETRICALLY SURVEYING AN OBJECT IN WHICH A REFERENCE PATTERN IS ARRANGED OUTSIDE SENSOR IMAGING BEAM PATHS

BACKGROUND OF THE INVENTION

The invention relates to a device for photogrammetrically surveying an object. Such devices are typically used for surveying motor vehicles, as discussed the paper "Fotogrammetrische Vermessung von Kraftfahrzeugen" (Photogrammetric surveying of motor vehicles) in ATZ 91 (1989) 6. In the case of this known device, surveying the object concerned is performed in such a way that photos of the object are taken as it were from a number of directions by means of at least two cameras containing the sensors and are evaluated in a computer; said computer supplies a digital data record, which precisely describes the dimensions of the object.

However, a prerequisite for achieving a satisfactory measurement result is that the spatial position of the sensors, i.e. of the cameras, relative to one another and relative to the object, i.e., the so-called outer orientation, and the position of the objectives lenses relative to the sensors assigned to them, the so-called inner orientation of the measuring equipment (cameras), are precisely known. This problem of outer orientation is particularly prominent when the sensors can be positioned individually, i.e., independently of one another, as a result of which a better adaptation of the imaging-beam paths to the respective objects in comparison with a fixed coupling of the sensors is possible.

According to the cited prior art, the inner and/or outer orientation is performed by there being arranged in the object space reference systems, for example graduated scales, which thus form as it were reference patterns in a spatial position which is defined in absolute terms and are imaged by means of the sensors as well as stored. The stored reference patterns are then taken into consideration by the computer in the evaluation of the images of the object supplied by the sensors.

SUMMARY OF THE INVENTION

The invention is based on the object of designing a device of the generic type in such a way that the positioning of the sensors, that is to say in the final analysis of the cameras also containing the perspective centers, relative to the object is not affected by the imaging of the reference pattern.

It is essential for the invention that although the reference pattern is arranged in a defined, fixed spatial position, it is outside the imaging-beam paths of the sensors, so that when positioning the sensors relative to one another and relative to the respective object there is no need to consider the accommodation of the reference pattern in these beam paths. The imaging of the reference pattern by means of the sensors is performed using optical deviating means, for example partially transmitting mirrors or prisms in the imaging-beam paths of the sensors. It is then possible to arrange a reference pattern, assigned to all the sensors, for example also relatively far away from the object and for example to cast a mirror image of this reference pattern onto all the sensors. In the case of a direct imaging of the reference pattern, said pattern would have to be arranged in the area of the object, which presents difficulties in particular in the case of small objects of which the shape is to be recorded exactly by the device.

BRIEF DESCRIPTION OF THE DRAWINGS

An illustrative embodiment of the invention is explained below with reference to the figure, which schematically shows a device containing three sensors.

DETAILED DESCRIPTION OF THE PREFERRED EMBODIMENTS

Figure 1:
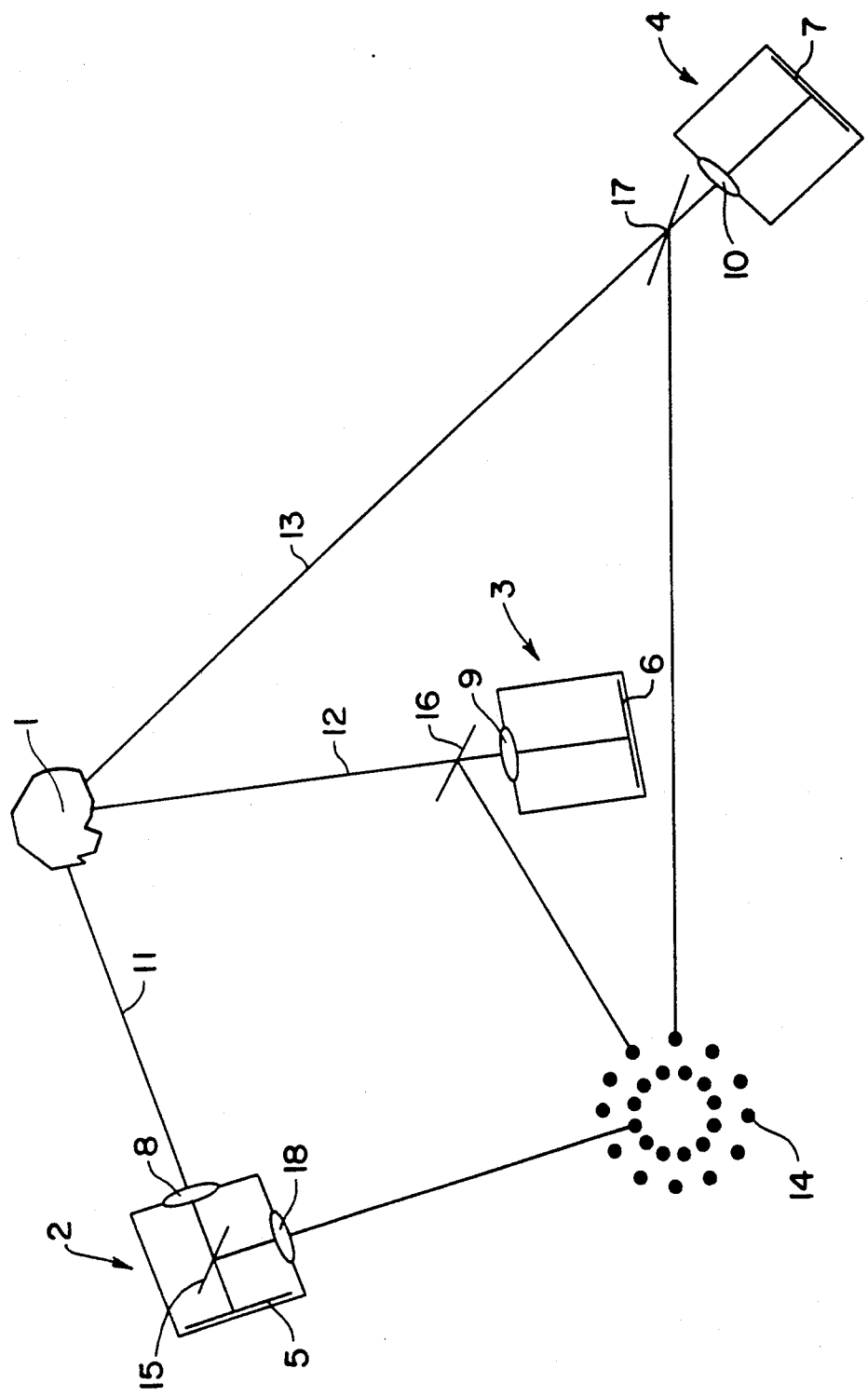

The object to be surveyed is denoted by 1. Arranged around it in differing spatial position are three cameras 2, 3 and 4, which in each case contain as essential component parts a sensor 5, 6 and 7 as well as an objective lens 8, 9 and 10. The imaging-beam paths of the individual cameras or sensors are denoted by 11, 12 and 13. As is evident, the cameras 2, 3 and 4 can be positioned individually, i.e independently of one another, with respect to the object 1, so that their position can be chosen with regard to the optimum surveying of the respective object.

Not shown, since known with respect to its structural design, is a data processing unit, connected to the sensors 5, 6 and 7, for evaluating the object images supplied by the individual sensors; as already stated at the beginning, this data processing unit supplies a digital data record, which describes the spatial form of the object.

For an accurate surveying of the object 1, exact recording both of the position of the objectives 8, 9 and 10 relative to the sensors 5, 6 and 7 assigned to them, i.e. the inner orientation of the cameras 2, 3 and 4, and the spatial position of the cameras 2, 3 and 4 relative to one another as well as relative to the object 1 is necessary. For reasons of the accuracy required, the recording of these spatial positions is performed not by mechanical means, that is to say for example by means of scales on adjusting mechanisms for the cameras, but optically by imaging of the optical reference pattern 14, which is located in a defined spatial position in absolute terms. This optical reference pattern is typically in the form of concentric circular marks, as shown. In this illustrative embodiment, for this purpose there are arranged in the imaging-beam paths 11, 12 and 13 partially transmitting mirrors 15, 16 and 17 (the first within the camera 2, the two others outside the camera 3 or 4 assigned to them), which are aligned in such a way that they cast mirror images of the reference pattern 14 onto the sensor surface of the camera concerned according to the respective position and alignment of the latter. It goes without saying that the mirrors 15, 16 and 17 must have an exact, defined position with respect to the respective sensor surface 5, 6 and 7, so they are firmly connected to the respective camera 2, 3 and 4.

As indicated in the case of the camera 2 by the position of the partially transmitting mirror 15, the latter need not lie as it were outside the camera, that is to say outside the distance between objective 8 and object 1, but can also be arranged in the distance between sensor 5 and objective 8, there then being provided, if appropriate, an additional objective 18 in the camera housing. The possibility then exists of approaching very close to the object 1 with the camera 2.

Consequently, the invention provides a device of the generic type which allows accurate surveying of different objects without affecting the capability of positioning the sensors with respect to the object.

I claim:

1. A device for photogrammetrically surveying an object, comprising:
   at least two individually positionable optical sensors;
   an objective lens associated with each of said optical sensors in a defined spatial relative position;
   an optical reference pattern, arranged on the object space side of said optical sensors in a known, fixed spatial position, for detecting at least one of the following positions by directing said reference pattern onto said sensors;
   the position of said objective lens with respect to its associated sensor,
   the position of said sensors relative to one another, and
   the position of said sensors with respect to said object; and
   optical deviating means associated with each of said sensors and in a defined position with respect to its associated sensor, for directing said reference pattern,
   wherein said optical reference pattern is arranged outside the imaging-beam paths, running between said object and said sensors.

2. A device according to claim 1, wherein said optical deviating means are at least partially transmitting and are located in said imaging-beam paths.

3. A method for photogrammetrically surveying an object, comprising the steps of:
   arranging an optical reference pattern on the object space side of at least two individually positionable optical sensors in a known, fixed position outside the imaging beam paths running between said object and said sensors;
   deflecting said optical reference pattern onto said sensors; and
   detecting at least one of the following positions;
   the position of an objective lens associated with each sensor,
   the position of said sensors relative to one another, and
   the position of said sensors with respect to said object.

* * * * *